UNITED STATES PATENT OFFICE.

ISADOR L. HALMAN, OF BROOKLINE, MASSACHUSETTS, ASSIGNOR TO H C RED LABEL CHEMICAL COMPANY, OF BOSTON, MASSACHUSETTS, A CORPORATION OF MASSACHUSETTS.

CLEANSING AND DISINFECTING FLUID.

1,133,639.  Specification of Letters Patent.  Patented Mar. 30, 1915.

No Drawing.   Application filed May 7, 1913.  Serial No. 766,069.

*To all whom it may concern:*

Be it known that I, ISADOR L. HALMAN, a citizen of the United States, and a resident of Brookline, county of Norfolk, State of Massachusetts, have invented an Improvement in Cleansing and Disinfecting Fluid, of which the following description, in connection with the accompanying drawing, is a specification, like characters on the drawing representing like parts.

This invention relates to cleaning and disinfecting fluids, and has for its object the production of a liquid which will be suitable for use in the laundry, and also which will be an efficient paint remover, varnish remover, and enamel remover, which will be non-poisonous, so that traces of said material left upon laundry, cooking utensils, dishes, and the like, will produce no unfavorable effects upon the subsequent use of such articles, or upon the food contained or cooked in such dishes, utensils, etc.

In preparing the composition which forms the subject matter of this invention, I preferably proceed as follows: Into a suitable closed mixing vessel I introduce from 80 to 82 pounds of substantially pure water, at ordinary temperature. I then introduce, while stirring, 9.8 pounds of potassium hydrate (KOH), and preferably the pure article, as distinguished from the crude or commercial article. The agitation is continued until substantially the entire amount of potassium hydrate has been dissolved. During this time a small amount of heat is generated in the solution. As soon as the potassium hydrate has been dissolved, or even before the last traces have been dissolved, I add about 2.5 pounds of ammonium chlorid (sal ammoniac) and continue the stirring. The temperature thereupon rises to a still further degree. I thereupon add about 1.25 pounds of potassium carbonate ($K_2CO_3$) and continue the stirring until this is dissolved. I then add 4.95 to 5 pounds of alcohol, for example methyl alcohol, although homologues thereof may be employed if desired.

The completed mixture is found to be a very efficient composition for the purposes described, and will readily lift the varnish or paint from wood, by applying said mixture thereto at ordinary temperatures, for example with a swab or brush. As soon as the material has sufficiently softened the paint, etc., I may then scrub off the entire mixture, by the use of a wet sponge or wet scrubbing brush, and the water thereby added prevents further action of the compound. By this means if so desired, I may remove only the outer coat of paint or varnish, while leaving the inner coat substantially intact. From wood having a large number of coats of paint I may remove any desired number in this manner.

The compound does not greatly affect the natural color of wood by discoloration, and does not raise the grain of wood, for example oak wood, and thereby avoids one of the great objections to the many alkaline paint removers heretofore employed.

I have found that if ammonium chlorid in materially different proportions, than given herein, is employed, that wood is discolored, the grain thereof is raised, or that the compound will not act equally well to soften paint, varnish, and enamel. That is, if materially less than the stated amount of ammonium chlorid is employed, the completed mixture may soften some paints but will not soften enamels. I therefore call attention to the fact that my compound readily penetrates paint, varnish, enamel, etc., which is a distinct advantage over most of the compositions heretofore employed as paint removers. In addition to the above advantages, the ammonium chlorid in these proportions, acts as an emollient of the causticity of the potassium hydrate and prevents burning the wood.

For laundry purposes, and for ordinary household use as a detergent it is preferable to dilute the compound with water before use, although the compound, even at full strength, does not weaken or injure ordinary fabrics.

The formula above given may be somewhat modified, without departing from the spirit of the invention.

While in the above example, the proportions are stated in terms of pounds, it is obvious that any other unit of measure or weight may be similarly employed, if it is desired to prepare larger or smaller quantities of the compound.

I desire to call attention to the fact that each of these ingredients has been previously employed in detergent compounds, but not all in combination, nor in the same proportions. With none of the compounds heretofore employed can the same results be secured, as with the compound which forms the subject matter of my present invention.

Claims:

1. A cleaning fluid comprising a solution of from 9% to 11% of a caustic alkali, from 1% to 2% of alkali carbonate, from 2% to 3% of an ammonium compound, and from 4% to 6% of an alcohol.

2. A cleaning fluid comprising an aqueous solution containing about 9.8% of potassium hydrate, 2.5% of ammonium chlorid, 1.25% of potassium carbonate, and 4.95% of alcohol.

3. A cleaning fluid comprising an aqueous solution containing active alkali hydrate and ammonium chlorid, said alkali hydrate being in the proportion of four to one of the ammonium chlorid, in combination with alkali carbonate in the slightly smaller proportions than the ammonia gas in solution, and alcohol.

4. A cleansing fluid comprising from 9% to 11% of a caustic alkali, from 2% to 3% sal ammoniac, from 1% to 2% of alkali carbonate, from 4% to 6% of alcohol, and from 84% to 78% of substantially pure water.

In testimony whereof, I have signed my name to this specification, in the presence of two subscribing witnesses.

ISADOR L. HALMAN.

Witnesses:
CARL R. JONSSON,
FRANK A. BEAN.